United States Patent
Mitrovic et al.

(10) Patent No.: US 10,400,858 B2
(45) Date of Patent: Sep. 3, 2019

(54) REDUCTION GEARBOX FOR AIRCRAFT ENGINE

(71) Applicant: Pratt & Whitney Canada Corp., Longueuil (CA)

(72) Inventors: Lazar Mitrovic, Longueuil (CA); Keith Morgan, Westmount (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 635 days.

(21) Appl. No.: 15/177,783

(22) Filed: Jun. 9, 2016

(65) Prior Publication Data

US 2017/0356525 A1    Dec. 14, 2017

(51) Int. Cl.
| | |
|---|---|
| *F16H 1/20* | (2006.01) |
| *F02C 7/36* | (2006.01) |
| *B64D 35/00* | (2006.01) |

(52) U.S. Cl.
CPC ............ *F16H 1/20* (2013.01); *B64D 35/00* (2013.01); *F02C 7/36* (2013.01); *F05D 2260/4031* (2013.01)

(58) Field of Classification Search
CPC .............. F16H 1/20; B64D 35/00; F02C 7/36
See application file for complete search history.

(56) References Cited

U.S. PATENT DOCUMENTS

| | | | |
|---|---|---|---|
| 4,796,424 A * | 1/1989 | Farrar | F02C 7/04 244/69 |
| 8,324,746 B2 | 12/2012 | Bradbrook | |
| 8,461,704 B2 | 6/2013 | McLoughlin et al. | |
| 8,943,839 B2 | 2/2015 | Merry et al. | |
| 9,428,267 B2 * | 8/2016 | DeVita | B64C 27/12 |
| 2004/0168427 A1* | 9/2004 | Truco | F01D 13/003 60/226.1 |
| 2006/0137355 A1 | 6/2006 | Welch et al. | |
| 2009/0227415 A1 | 9/2009 | Buelna | |
| 2010/0162719 A1* | 7/2010 | Bowman | F02C 7/32 60/773 |
| 2015/0251770 A1 | 9/2015 | Bisson et al. | |

FOREIGN PATENT DOCUMENTS

EP        3002435        4/2016

* cited by examiner

*Primary Examiner* — David M Fenstermacher
(74) *Attorney, Agent, or Firm* — Norton Rose Fulbright Canada LLP (57) ABSTRACT

A reduction gearbox for an aircraft engine, including an input pinion configured to be driven by the aircraft engine, a input gear meshed with the input pinion, a drive gear meshed with the input gear, an output pinion, and an output gear meshed with the output pinion and configured to drive an output shaft of the aircraft engine. The reduction gearbox is selectively configurable between an engaged configuration where the input gear and output pinion are drivingly engaged and a disengaged configuration where the input gear is rotatable independently of the output pinion. The output shaft may drive a propeller and the gearbox may include a propeller brake. A method of driving a generator of a turboprop engine is also discussed.

17 Claims, 6 Drawing Sheets

REDUCTION GEARBOX FOR AIRCRAFT ENGINE

TECHNICAL FIELD

The application relates generally to a reduction gearbox for an aircraft engine and, more particularly, for an aircraft engine driving a generator.

BACKGROUND OF THE ART

Some turboprop gas turbine engines include a propeller brake which prevents rotation of propeller by preventing the rotation of the power turbine and power shaft. Such a brake can be used when the aircraft is on the ground, to run the engine and use the rotating high pressure shaft to provide pressurized air through the high pressure compressor section and/or drive a generator to perform some of the functions of an auxiliary power unit while the power shaft is prevented from rotating. However, running of the engine with the rotation of the power turbine shaft being blocked may be detrimental to the performance of the engine. Moreover, the amount of air and/or power generated may be insufficient, particularly in a hot weather environment.

SUMMARY

In one aspect, there is provided a reduction gearbox for an aircraft engine, the gearbox comprising: an input pinion configured to be driven by the aircraft engine; an input gear meshed with the input pinion; a drive gear meshed with the input gear; an output pinion, the reduction gearbox being selectively configurable between an engaged configuration and a disengaged configuration, the input gear and output pinion being drivingly engaged in the engaged configuration, the input gear being rotatable independently of the output pinion in the disengaged configuration; and an output gear meshed with the output pinion, the output gear configured to drive an output shaft of the aircraft engine.

In another aspect, there is provided a turboprop engine comprising: a power shaft rotatable by a turbine, the power shaft connected to an input pinion; a generator drivingly engaged to a generator drive gear; a propeller rotatable by an output shaft, the output shaft connected to an output gear; a reduction gearbox having a plurality of drivingly engaged gears defining a transmission path, the transmission path having a first portion meshed with the input pinion and with the generator drive gear and a second portion meshed with the output gear, the reduction gearbox being selectively configurable between an engaged and a disengaged configuration, wherein: in the engaged configuration, the first portion of the transmission path is drivingly engaged to the second portion of the transmission path, allowing the input pinion to drive the generator drive gear and output gear through the reduction gearbox, and in the disengaged configuration, the first portion of the transmission path is rotatable independently of the second portion of the transmission path, allowing the input pinion to drive the generator drive gear through the reduction gearbox without driving the output gear; and a brake selectively engageable with the second portion of the transmission path to selectively prevent rotation of the propeller.

In a further aspect, there is provided a method of configuring a gearbox for using a turboprop engine as an auxiliary power unit, the gearbox defining a transmission path between a power shaft and a propeller of the engine, the method comprising: maintaining an engagement of a first portion of the transmission path with a generator and with the power shaft while disengaging a second portion of the transmission path from the first portion of the transmission path, the second portion of the transmission path being drivingly engaged to the propeller, wherein disengaging the first portion of the transmission path from the second portion of the transmission path allows the first portion of the transmission path to be driven by the power shaft independently of the second portion of the transmission path; and preventing rotation of the propeller.

DESCRIPTION OF THE DRAWINGS

Reference is now made to the accompanying figures in which.

DETAILED DESCRIPTION

Figure 1:
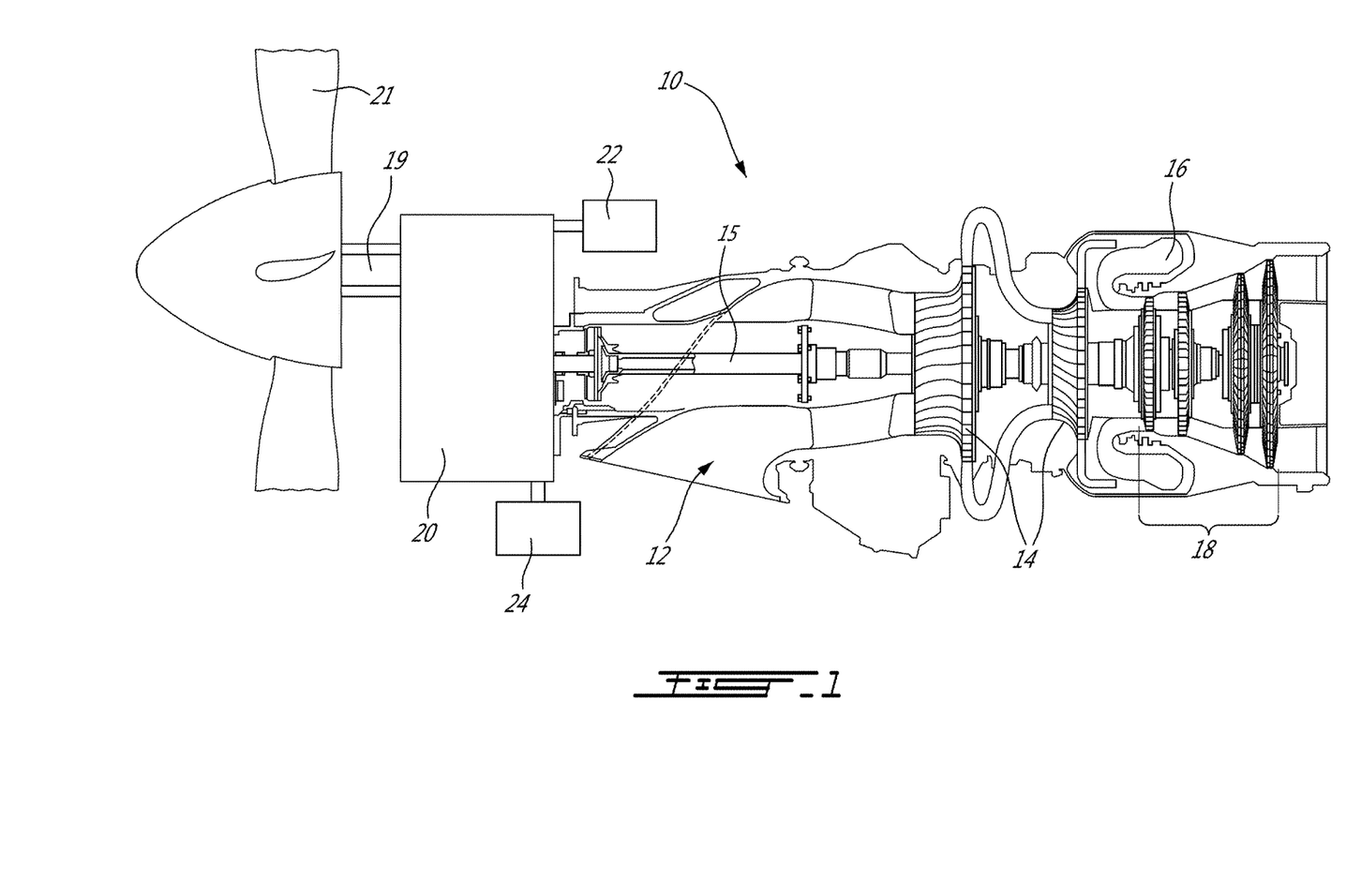
FIG. 1 is a schematic cross-sectional view of a gas turbine engine.

FIG. 1 illustrates a turboprop gas turbine engine 10 of a type preferably provided for use in subsonic flights, generally comprising in serial flow communication an intake 12 through which air is drawn, a compressor section 14 for pressurizing the air, a combustor 16 in which the compressed air is mixed with fuel and ignited for generating an annular stream of hot combustion gases, and a turbine section 18 for extracting energy from the combustion gases. A power shaft 15 connected to one or more turbine(s) of the turbines section 18 projects forwardly to transmit a driving force to an output shaft 19 including a propeller 21 via a reduction gearbox generally shown at 20. The power shaft 15 is also drivingly engaged through the reduction gearbox 20 to a plurality of accessories 22 and to a generator 24, as will be further detailed below.

An exemplary embodiment of the reduction gearbox 20 is shown in FIGS. 2-6. The gearbox 20 is configured so as to be able to selectively drive the generator 24 and other accessories 22 together with the output shaft 19 and propeller 21, or drive the generator 24 without driving the output shaft 19 and in a particular embodiment without driving the accessories 22. This may allow the engine 10 to be used as an auxiliary power unit (APU) when on ground, which may eliminate the need for a separate APU to be provided in the aircraft.

Figure 2:
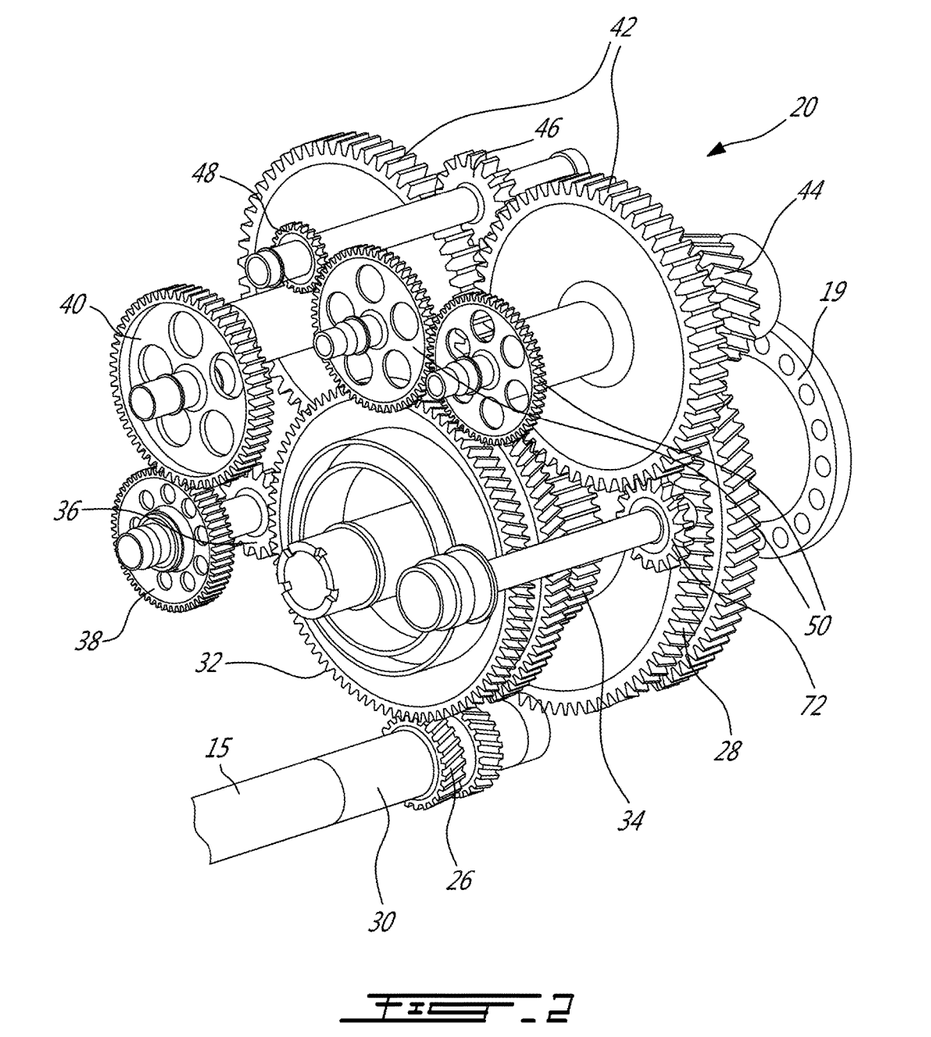
FIG. 2 is a schematic tridimensional view of a reduction gearbox according to a particular embodiment, which may be used in the engine of FIG. 1.
Figure 3:
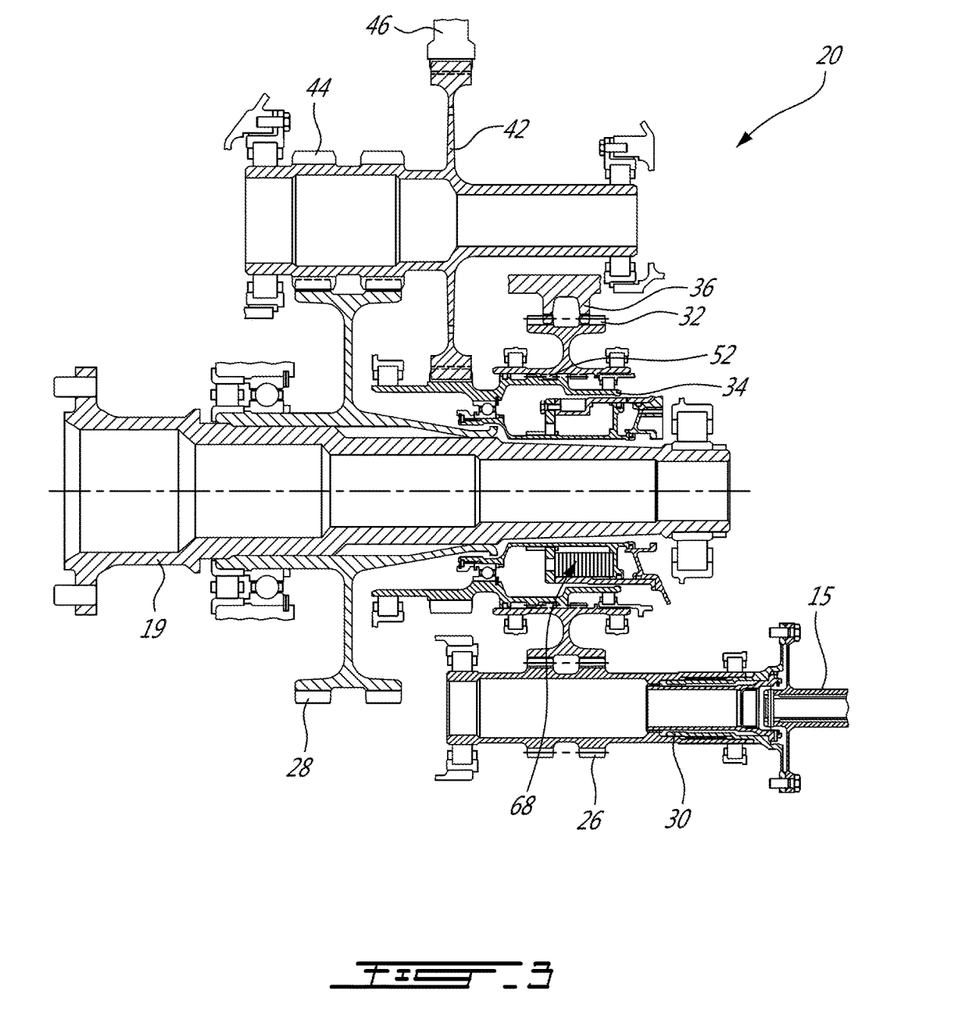
FIG. 3 is a schematic cross-sectional view of the gearbox of FIG. 2.
Figure 6:
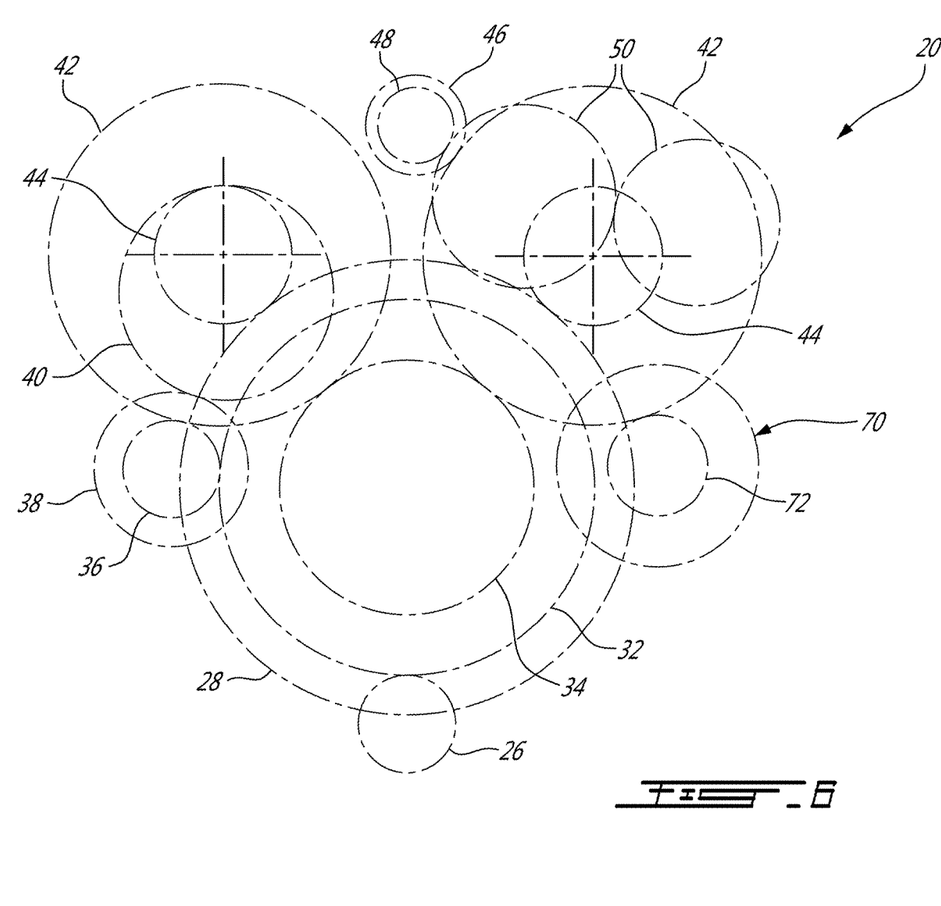
FIG. 6 is a schematic of pitch circles of the gears of the gearbox of FIG. 2.

Referring particularly to FIGS. 2-3 and 6, the power shaft 15 has an input pinion 26 connected thereto, and the output shaft 19 has an output gear 28 connected thereto. In the embodiment shown, the input pinion 26 is directly connected to a drive shaft 30 which is configured as an extension of the power shaft 15, i.e. coaxial with and directly connected to the power shaft 15, and the output gear 28 is directly connected to the output shaft 19. Other configurations are also possible.

In the present specification, including claims, the term "drivingly engaged" is intended to include any engagement allowing two components to rotate together, at the same speed or at different speeds, and in the same direction or in different directions, including, but not limited to, direct connections, direct meshed engagement, engagement through meshing with one or more intermediate meshed element(s) (gear, pinion, etc.) and engagement through intermediate elements, e.g. idler gear.

The gearbox 20 has a input gear 32 meshed with the input pinion 26 of the power shaft 15; in the embodiment shown, the input gear 32 and input pinion 26 are double helical gears. The gearbox 20 also includes at least one output pinion 44 (two in the embodiment shown), each meshed with the output gear 28 of the output shaft 19; in the embodiment shown, the output pinions 44 and output gear 28 are also double helical gears.

The gearbox 20 has a generator drive gear 36 meshed with the input gear 32, and which is also a helical gear. The generator drive gear 36 is drivingly engaged to the generator 24. In the embodiment shown and referring also to FIG. 6, the generator drive gear 36 is an idler gear, mounted on a same shaft as an additional idler gear 38 which is meshed with an additional drive gear 40 directly connected to a rotatable shaft of the generator 22. Other configurations are also possible.

The gearbox 20 is selectively configurable between an engaged configuration and a disengaged configuration. In the engaged configuration (FIG. 4), the input gear 32 and output pinions 44 are drivingly engaged; in the disengaged configuration (FIG. 5), the input gear 32 is rotatable independently of the output pinions 44. In the embodiment shown, the engagement between the input gear 32 and the output pinions 44 is obtained through intermediate gears and pinions, as will be further detailed below.

Still referring to FIGS. 2-3 and 6, the gearbox 20 includes an intermediate pinion 34, which is drivingly engaged with the input gear 32 in the engaged configuration and rotatable independently from the input gear 32 in the disengaged configuration. The configuration of the gearbox 20 is thus changed by engaging or disengaging the input gear 32 and intermediate pinion 34.

The gearbox 20 of the embodiment shown further includes two intermediate gears 42 each drivingly engaged with a respective one of the output pinions 44. In the embodiment shown, the corresponding output pinion 44 and intermediate gear 42 are drivingly engaged by a vernier spline coupling, such as to rotate together coaxially and at a same speed; the vernier spline couplings allow adjustment of load sharing between the two branches defined by the two sets of connected pinion 44 and gear 42. The intermediate gears 42 are meshed with the intermediate pinion 34; in the embodiment shown, the intermediate gears 42 and intermediate pinion 34 are spur gears. Alternately, a single set of drivingly engaged intermediate gear 42 and output pinion 44 may be provided.

The gearbox 20 further includes an accessory drive gear 46 meshed with one of the intermediate gears 42, and which is also a spur gear. The accessory drive gear 46 is drivingly engaged to one or more accessories 22 (e.g. hydraulic pump(s), propeller control components, gearbox oil pump, cooling fan, freon pump) of the aircraft. In the embodiment shown and referring particularly to FIGS. 2 and 6, the accessory drive gear 46 is an idler gear spur which is connected to a same shaft as an additional idler spur gear 48 which is meshed with a first one of a respective series of meshed spur accessory gears 50, at least some of which being directly connected to a rotatable shaft of a respective accessory. Other configurations are also possible.

Although spur gear and double helical gears are shown and described, it is understood that any other adequate types of gears can be used in the gearbox 20 and gears meshed therewith. In a particular embodiment, the input pinion 26 and output gear 28 are axially fixed by thrust bearings of their respective shafts, and the intermediate spur pinion and gear 34, 42 between the helical input pinion and gear 26, 32 and helical output pinions and gears 44, 28 allows the input gear 32 and the output pinions 44 to float axially, and for the axial loads in each double helical mesh to be in equilibrium between the driving and driven gears.

Figure 4:
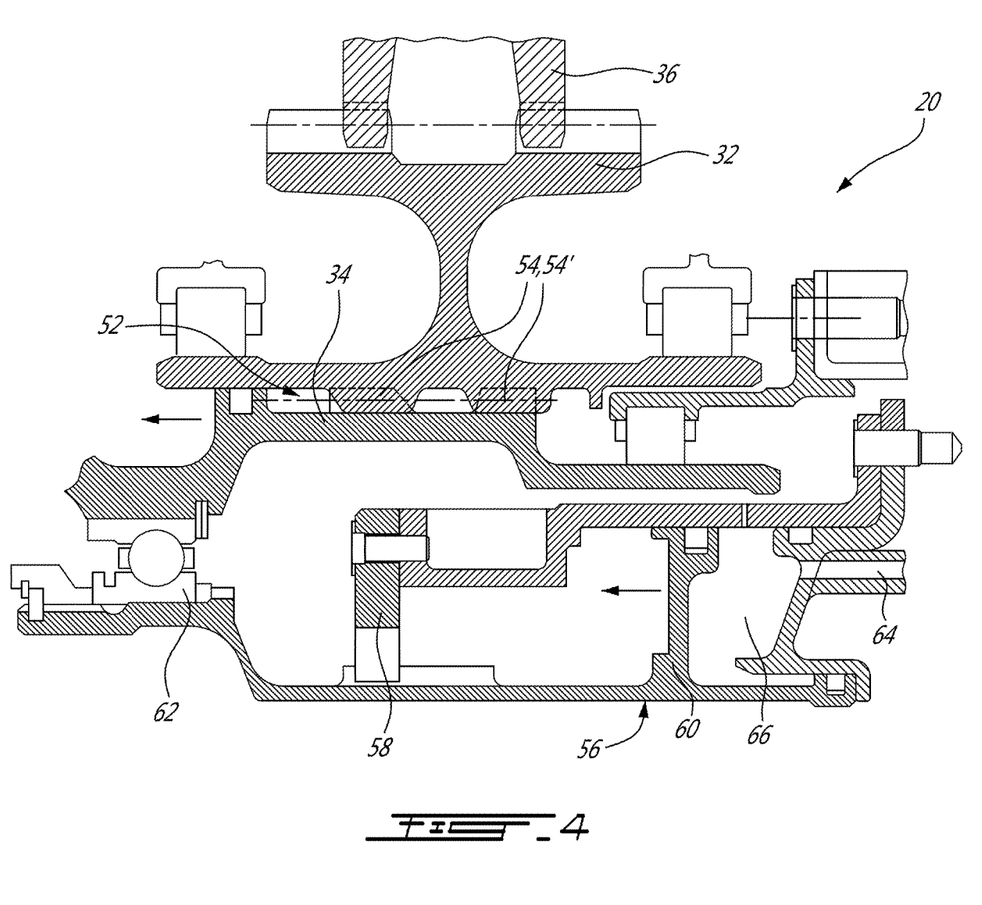
FIG. 4 is a schematic enlarged view of a portion of the gearbox of FIG. 2, showing the gearbox in an engaged configuration.
Figure 5:
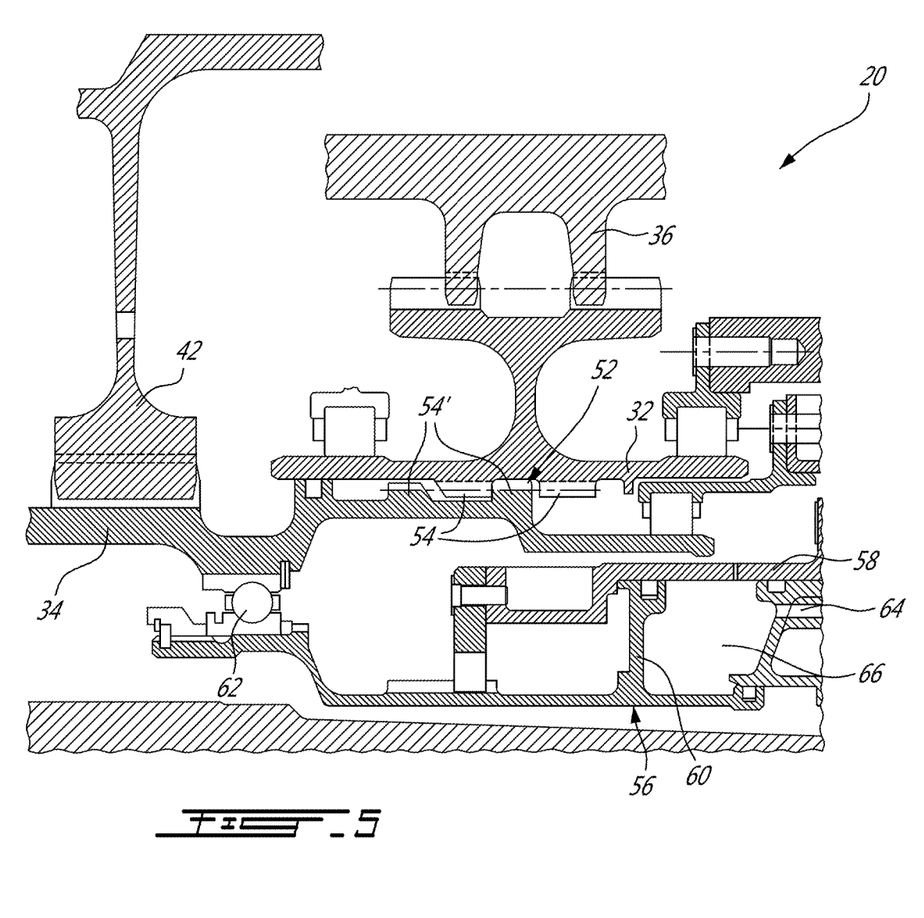
FIG. 5 is a schematic enlarged view of a portion of the gearbox of FIG. 2, showing the gearbox in a disengaged configuration.

Referring to FIGS. 4-5, a particular embodiment for a connection 52 allowing the intermediate pinion 34 and input gear 32 to be selectively engageable and disengageable is shown and will be detailed below. It is understood that any other adequate type of connection or engagement can alternately be used.

Referring particularly to FIG. 4 showing the engaged configuration, the intermediate pinion 34 and input gear 32 are engaged through a slidable spline connection 52. When the spline connection 52 is engaged, the input gear 32 and intermediate pinion 34 act as if connected to a same shaft, and are rotatable together coaxially and at a same speed. The intermediate pinion 34 and input gear 32 are relatively slidable so as to be able to disconnect the spline connection 52 for the disengaged configuration.

The spline connection 52 is defined by two axially spaced apart teeth 54, 54' on each of the intermediate pinion 34 and input gear 32, with the teeth 54, 54' of one of the intermediate pinion 34 and input gear 32 defining a male spline (protuberance) while the teeth 54, 54' of the other of the intermediate pinion 34 and input gear 32 define a female spline (slot), engaged one within the other in the engaged configuration. The teeth 54, 54' are spaced apart an axial distance which is greater than the axial length of the teeth 54, 54'. Accordingly, in the disengaged configuration shown in FIG. 5, the teeth 54, 54' of the intermediate pinion 34 and input gear 32 are disengaged and no longer axially aligned, and thus relatively rotatable without interference.

A clutch provides for the selective engagement of the spline connection 52 between the intermediate pinion 34 and input gear 32 to provide the relative sliding movement allowing to change the configuration of the gearbox 20. In the embodiment shown, the clutch includes a hydraulic actuator 56 including a cylinder 58 attached to the housing of the gearbox 20, and a piston 60 slidable within the cylinder 58. The input gear 32 has a fixed axial position, and the intermediate pinion 34 is connected to the piston 60. The intermediate pinion 34 is thus axially movable with the piston 60 to engage and disengage the spline connection 52. The piston 60 acts on the intermediate pinion 34 through a thrust split inner ring ball bearing 62. A dedicated oil line 64 feeds an oil chamber 66 of the hydraulic cylinder 58 adjacent the head of the piston 60. The clutch is thus activated by opening a valve (not shown) in the oil line 64, so that oil pressure in the chamber 66 acting on the piston 60 moves the intermediate pinion 34 out of engagement with the input gear 32.

In the embodiment shown, the gearbox 20 is biased toward the engaged configuration. The oil pressure of the actuator 56 thus act against the biasing force of more spring(s) 68 (see FIG. 3), e.g. helical spring(s) upon movement toward the disengaged configuration.

The gears of the reduction gearbox 20 thus define a transmission path having selectively engageable first and second portions, the first portion (which in the embodiment shown corresponds to the input gear 32) being meshed with the input pinion 26 of the power shaft 15 and with the generator drive gear 36 and the second portion (which in the embodiment shown includes the intermediate pinion 34, the intermediate gears 42 and the output pinions 44) being meshed with the output gear 28 of the output shaft 19. It is understood that other gear configurations than that shown can be provided in the first and second portions of the transmission path, including, but not limited to, a different number of gears and/or different types of gears and gear engagements.

In the engaged configuration, the first portion of the transmission path is drivingly engaged to the second portion of the transmission path, which allows the input pinion 26 to drive the generator drive gear 36 and output gear 28 through the reduction gearbox 20; the generator 24 and propeller 21 are thus driven together. In the disengaged configuration, the first portion of the transmission path is rotatable independently of the second portion of the transmission path because of the disconnected spline connection 52 in the gearbox 20. This allows the input pinion 26 to drive the generator drive gear 36 through the reduction gearbox 20 without driving the output gear 28; the generator 24 is thus driven without driving the propeller 21.

With the gearbox 20 in the disengaged configuration, the engine 10 may run at a setting required to provide pressurized air from the compressor section 14 to meet the aircraft bleed requirements.

In the embodiment shown, the accessory drive gear 46 is meshed with the second portion of the transmission path. Accordingly, when the gearbox 20 is in the engaged configuration, the accessory drive gear 46 is drivable by the input pinion 26, and when the gearbox 20 is in the disengaged configuration, the input pinion 26 is rotatable without driving the accessory drive gear 46. In cases when it would be desirable to drive accessories 22 without driving the propeller 21, the accessory drive gear 46 can alternately be meshed with the first portion of the transmission path, or a respective accessory drive gear can be meshed with each portion of the transmission path so as to have only selected ones of the accessories 22 being driven when rotation of the propeller 21 is not driven.

Referring to FIG. 6, the gearbox 20 further includes a brake 70 selectively engageable with the second portion of the transmission path to selectively prevent rotation of the propeller 21 when the gearbox 20 is in the disengaged configuration. In the embodiment shown, the brake 70 includes a gear 72 (see also FIG. 2) meshed with one of the intermediate gears 42 to selectively block its rotation. It is understood that the brake 70 can engaged any other suitable element of the gearbox 20 or propeller assembly to allow for rotation of the propeller 21 to be prevented.

In a particular embodiment, the gearbox can thus be configured to use a turboprop engine as an auxiliary power unit by maintaining an engagement of the first portion of the transmission path with the generator 24 and with the power shaft 15 while disengaging the second portion of the transmission path from the first portion of the transmission path. Disengaging the first portion of the transmission path from the second portion of the transmission path allows the first portion of the transmission path to be driven by the power shaft 15 independently of the second portion of the transmission path. Rotation of the propeller 21 is then prevented, for example by engaging the brake 70 with the second portion of the transmission path. The generator 24 can thus be driven independently of the propeller 21. In the embodiment shown, disengaging the first and second portions of the transmission path includes axially sliding the intermediate pinion 34 to disengage the slidable spline connection 52 between the intermediate pinion 34 and input gear 32, through actuation of the hydraulic actuator 56 against the biasing force of the spring(s) 68.

The gearbox 20 advantageously allows the engine 10 to drive the generator 24 with the power shaft 15 when the rotation of the propeller 21 is prevented, i.e. to prevent rotation of the propeller 21 without the need to prevent rotation of the power shaft 15. In a particular embodiment, this allows for improved performances of the engine 10, as compared to a similar engine where the generator 24 is driven by the high pressure shaft with rotation of the power shaft 15 being prevented.

The above description is meant to be exemplary only, and one skilled in the art will recognize that changes may be made to the embodiments described without departing from the scope of the invention disclosed. For example, the output gear could be used to drive a different load than a propeller. Still other modifications which fall within the scope of the present invention will be apparent to those skilled in the art, in light of a review of this disclosure, and such modifications are intended to fall within the appended claims.

The invention claimed is:

1. A reduction gearbox for an aircraft engine, the gearbox comprising:
   an input pinion configured to be driven by the aircraft engine;
   an input gear meshed with the input pinion;
   a drive gear meshed with the input gear;
   an output pinion, the reduction gearbox being selectively configurable between an engaged configuration and a disengaged configuration, the input gear and output pinion being drivingly engaged in the engaged configuration, the input gear being rotatable independently of the output pinion in the disengaged configuration;
   an output gear meshed with the output pinion, the output gear configured to drive an output shaft of the aircraft engine,
   an intermediate pinion drivingly engaged to the input gear in the engaged configuration and rotatable independently of the input gear in the disengaged configuration; and
   an intermediate gear meshed with the intermediate pinion, the intermediate gear being drivingly engaged to the output pinion; and
   a second drive gear meshed with the intermediate gear.

2. The reduction gearbox as defined in claim 1, further comprising a brake selectively engageable with the reduction gearbox to selectively prevent rotation of the output pinion.

3. The reduction gearbox as defined in claim 1, further comprising an additional intermediate gear meshed with the intermediate pinion, and an additional output pinion drivingly engaged with the additional intermediate gear, the output gear being meshed with the additional output pinion.

4. The reduction gearbox as defined in claim 1, wherein the intermediate pinion and input gear are engaged through a slidable spline connection, the intermediate pinion and input gear being relatively slidable so as to be interconnected by the spline connection in the engaged configuration, the spline connection being disconnected in the disengaged configuration.

5. The reduction gearbox as defined in claim 4, wherein one of the intermediate pinion and input gear is connected to a piston of an actuator actuable to provide the relative sliding movement between the engaged and disengaged configurations.

6. The reduction gearbox as defined in claim 5, wherein the piston of the actuator is actuable in one direction and biased in an opposed direction by a plurality of springs.

7. A turboprop engine comprising:
a power shaft rotatable by a turbine, the power shaft connected to an input pinion;
a generator drivingly engaged to a generator drive gear;
a propeller rotatable by an output shaft, the output shaft connected to an output gear;
a reduction gearbox having a plurality of drivingly engaged gears defining a transmission path, the transmission path having a first portion meshed with the input pinion and with the generator drive gear and a second portion meshed with the output gear, the reduction gearbox being selectively configurable between an engaged and a disengaged configuration, wherein:
in the engaged configuration, the first portion of the transmission path is drivingly engaged to the second portion of the transmission path, allowing the input pinion to drive the generator drive gear and output gear through the reduction gearbox, and
in the disengaged configuration, the first portion of the transmission path is rotatable independently of the second portion of the transmission path, allowing the input pinion to drive the generator drive gear through the reduction gearbox without driving the output gear; and
a brake selectively engageable with the second portion of the transmission path to selectively prevent rotation of the propeller,
wherein in the engaged configuration, the first and second portions of the transmission path are engaged through relatively slidable gears interconnected by a slidable spline connection such as to be rotatable together, the spline connection being disconnected in the disengaged configuration.

8. The turboprop engine as defined in claim 7, further comprising an accessory drivingly engaged to an accessory drive gear, the accessory drive gear meshed with the second portion of the transmission path, and wherein in the engaged configuration the accessory drive gear is drivable by the input pinion, and in the disengaged configuration the input pinion is rotatable without driving the accessory drive gear.

9. The turboprop engine as defined in claim 7, wherein the first portion of the transmission path is defined by an input gear meshed with the input pinion and with the generator drive gear, the input gear being selectively engageable and disengageable from an adjacent gear of the second portion of the transmission path.

10. The turboprop engine as defined in claim 7, wherein one of the relatively slidable gears is connected to a piston of an actuator actuable to provide the relative sliding movement between the engaged and disengaged configurations.

11. The turboprop engine as defined in claim 10, wherein the piston of the actuator is actuable in one direction and biased in an opposed direction by a plurality of springs.

12. The turboprop engine as defined in claim 7, wherein the first and second portions of the transmission path are biased toward the engaged configuration.

13. A method of configuring a gearbox for using a turboprop engine as an auxiliary power unit, the gearbox defining a transmission path between a power shaft and a propeller of the engine, the method comprising:
maintaining an engagement of a first portion of the transmission path with a generator and with the power shaft while disengaging a second portion of the transmission path from the first portion of the transmission path, the second portion of the transmission path being drivingly engaged to the propeller, wherein disengaging the first portion of the transmission path from the second portion of the transmission path allows the first portion of the transmission path to be driven by the power shaft independently of the second portion of the transmission path, and wherein disengaging the second portion of the transmission path from the first portion of the transmission path includes disengaging a slidable spline connection between two gears of the reduction gearbox; and
preventing rotation of the propeller.

14. The method as defined in claim 13, wherein preventing rotation of the propeller includes engaging a brake with the second portion of the transmission path.

15. The method as defined in claim 13, wherein disengaging the slidable spline connection includes producing a relative sliding movement between the two gears.

16. The method as defined in claim 15, wherein the relative sliding movement between the two gears is produced against a plurality of springs biasing the transmission paths toward the engaged configuration.

17. A reduction gearbox for an aircraft engine, the gearbox comprising:
an input pinion configured to be driven by the aircraft engine;
an input gear meshed with the input pinion;
a drive gear meshed with the input gear;
an output pinion, the reduction gearbox being selectively configurable between an engaged configuration and a disengaged configuration, the input gear and output pinion being drivingly engaged in the engaged configuration, the input gear being rotatable independently of the output pinion in the disengaged configuration;
an output gear meshed with the output pinion, the output gear configured to drive an output shaft of the aircraft engine,
an intermediate pinion drivingly engaged to the input gear in the engaged configuration and rotatable independently of the input gear in the disengaged configuration;
an intermediate gear meshed with the intermediate pinion, the intermediate gear being drivingly engaged to the output pinion, and
an additional intermediate gear meshed with the intermediate pinion, and an additional output pinion drivingly engaged with the additional intermediate gear, the output gear being meshed with the additional output pinion.

* * * * *